US010229206B2

(12) United States Patent
Alonso et al.

(10) Patent No.: US 10,229,206 B2
(45) Date of Patent: Mar. 12, 2019

(54) SOCIAL SNIPPET AUGMENTING

(71) Applicant: Microsoft Corporation, Redmond, WA (US)

(72) Inventors: Omar Alonso, Redwood Shores, CA (US); Vasileios Kandylas, Sunnyvale, CA (US); Justin Ormont, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1480 days.

(21) Appl. No.: 13/957,891

(22) Filed: Aug. 2, 2013

(65) Prior Publication Data

US 2015/0039603 A1 Feb. 5, 2015

(51) Int. Cl.
G06F 17/30 (2006.01)
G06Q 10/06 (2012.01)
G06Q 50/00 (2012.01)
G06Q 50/20 (2012.01)
G06Q 50/26 (2012.01)

(52) U.S. Cl.
CPC .. *G06F 17/30867* (2013.01); *G06F 17/30864* (2013.01); *G06Q 10/06* (2013.01); *G06Q 50/01* (2013.01); *G06Q 50/20* (2013.01); *G06Q 50/26* (2013.01)

(58) Field of Classification Search
CPC .............................................. G06F 17/30867
USPC ........................................................ 707/728
See application file for complete search history.

(56) References Cited

U.S. PATENT DOCUMENTS

2005/0091202 A1* 4/2005 Thomas ............ G06F 17/30867
2005/0256866 A1* 11/2005 Lu ..................... G06F 17/30867
2007/0106685 A1* 5/2007 Houh ................ G06F 17/30796
(Continued)

FOREIGN PATENT DOCUMENTS

WO 2009094586 A1 7/2009

OTHER PUBLICATIONS

Li, et al., "Keyword Extraction for Social Snippets", In Proceedings of the 19th International Conference on World Wide Web, Apr. 26, 2010, 2 pages, http://wwwconference.org/proceedings/www2010/www/p1143.pdf.
(Continued)

*Primary Examiner* — Kimberly L Wilson
(74) *Attorney, Agent, or Firm* — The Watson I.P. Group, PLC; Vladan M. Vasiljevic

(57) ABSTRACT

One or more techniques and/or systems are provided for augmenting a social snippet with an augmentation tagline. For example, a search user may submit a search query through a search interface (e.g., "algebra help" search query). An entity associated with the search query may be identified (e.g., a math professor). A set of taglines associated with the entity may be retrieved (e.g., descriptive information about the math professor extracted from social networks, documents, websites, etc.). A social snippet for the entity may be augmented with an augmentation tagline selected from the set of taglines or generated based upon information relating to the entity. The augmented social snippet may be displayed through the search interface, and the augmentation tagline may indicate a relevance of the entity to the search user (e.g., an indication that the math professor teaches algebra at a university attended by the search user).

20 Claims, 8 Drawing Sheets

(56) References Cited

U.S. PATENT DOCUMENTS

| | | | |
|---|---|---|---|
| 2009/0193011 A1* | 7/2009 | Blair-Goldensohn | ........................ G06F 17/30719 |
| 2010/0306249 A1* | 12/2010 | Hill | ................... G06F 17/30867 707/769 |
| 2011/0137895 A1* | 6/2011 | Petrou | ............... G06F 17/30241 707/723 |
| 2011/0153686 A1 | 6/2011 | Campbell et al. | |
| 2011/0264648 A1 | 10/2011 | Gulik et al. | |
| 2012/0158720 A1 | 6/2012 | Luan et al. | |
| 2012/0166931 A1* | 6/2012 | Alonso | .............. G06Q 30/0201 715/234 |
| 2013/0097144 A1 | 4/2013 | Siamwalla et al. | |
| 2013/0260352 A1* | 10/2013 | Abraham | ................. G09B 7/02 434/350 |
| 2014/0101145 A1 | 4/2014 | Alonso et al. | |
| 2014/0108386 A1* | 4/2014 | Andler | .............. G06F 17/30867 707/723 |
| 2014/0279798 A1 | 9/2014 | Purohit et al. | |
| 2016/0171111 A1* | 6/2016 | Kraft | ................. G06F 17/30867 707/706 |

OTHER PUBLICATIONS

Muralidharan, et al., "Social Annotations in Web Search", In Proceedings of the SIGCHI Conference on Human Factors in Computing Systems, May 5, 2012, 10 pages, http://research.google.com/pubs/archive/38116.pdf.

Pantel, et al., "Social Annotations: Utility and Prediction Modeling", In Proceedings of the 35th International ACM SIGIR Conference on Research and Development in Information Retrieval, Aug. 12, 2012, 10 pages, http://www.patrickpantel.com/download/papers/2012/sigir12.pdf.

"International Search Report & Written Opinion for PCT Patent Application No. PCT/US2014/048998", dated Nov. 10, 2014, 9 Pages.

Bautin, et al., "Concordance-Based Entity-Oriented Search", In Proceedings of the IEEE/WIC/ACM International Conference on Web Intelligence, Nov. 2, 2007, pp. 586-592.

* cited by examiner

SOCIAL SNIPPET AUGMENTING

BACKGROUND

Many users may discover, explore, and/or interact with content through search interfaces. For example, a search engine may provide a user with search results such as images, websites, videos, or other content relevant to a search query submitted by the user to the search engine. The search results may be displayed as a list comprising search result titles, search result URLs, and/or search result snippets. A search result snippet may comprise a short fragment of text (e.g., a caption) that provides relevance cues about the search result to the user. For example, a car website search result may comprise a car website title, a car website URL, and a short snippet describing the car website. In this way, the user may efficiently review and explore the search results.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for augmenting a social snippet are provided herein. For example, a search query submitted by a search user through a search interface may be received (e.g., an "organic fruit" search query may be submitted through a search app, a search website, a mobile search interface, a video game console interface, etc.). An entity associated with the search query may be identified. The entity may comprise a person (e.g., an organic farmer having an area of expertise in organic fruit), a business (e.g., a food nutrition research company), a location (e.g., an organic farm), time (e.g., a particular year), a tangible object (e.g., plants), an idea (e.g., running), an intangible item (e.g., an endorsement, ranking, account, anecdote, etc. (e.g., on a social network)), and/or any other entity that may be identified from the search query, such as being associated with a topic of the search query.

A set of taglines associated with the entity may be retrieved. For example, a tagline may comprise a textual description, an image, and/or a variety of other information describing the entity (e.g., a social network tagline may comprise an image of the organic farmer and a description about interests of the organic farmer such as running or cooking). A tagline may be retrieved from a social network (e.g., a professional social network, a personal social network, a gaming social network, etc.), a document created by the entity, a website associated with the entity (e.g., a blog website, a question and answer website where users may post questions and/or answer questions, or any other website that may reference or describe the entity), or any other source that may provide information for the entity. Quality scores may be assigned to respective taglines within the set of taglines. A quality score may be assigned based upon a variety of criteria or quality metrics, such as a relevance to the search query (e.g., a tagline describing the organic farmer as having an interest in farming may be assigned a higher quality score than a tagline describing the organic farmer as having an interest in running), a source of a tagline (e.g., a tagline from a well-known social network website may be assigned a higher quality score than a personal website hosted by an unknown source), a length of a tagline, an assumed interest level of the user, a reading level of a tagline (e.g., a descriptive tagline may be assigned a higher quality score than a simple tagline and/or a tagline with grammatical errors), a language of a tagline (e.g., a tagline in a non-native language (e.g., of the user) may be assigned a lower quality score, a tagline in a language different than a certain number, percent, etc. of other taglines may be assigned a lower quality score, etc.), a second entity being specified within a tagline (e.g., a tagline specifying a farming company or research facility may be assigned a higher quality score than a tagline merely indicating that the organic farmer has an interest in cooking), and/or a variety of other quality metrics.

A social snippet for the entity may be obtained. In an example, the social snippet may be created where no social snippet exists for the entity. In another example, the social snippet may be created on the fly to create a unique personalized social snippet between a search user and the entity. In another example, the social snippet may be created where a cached social snippet is stale (e.g., exceeding a freshness time threshold). The social snippet may comprise an image, a description, and/or a variety of other information for the entity. The social snippet may be augmented with one or more augmentation taglines to create an augmented social snippet. In an example, a tagline having a quality score above a threshold (e.g., an augmentation threshold) may be selected from the set of taglines as an augmentation tagline for use in creating the augmented snippet. In another example where the set of taglines does not comprise at least one tagline (e.g., the set of taglines comprises an empty set because no taglines were identified and/or retrieved for the entity) and/or where the set of taglines does not comprise at least one tagline assigned a quality score above the augmentation threshold, identification information for the entity may be retrieved (e.g., information may be retrieved from social networks, documents created by the entity, websites mentioning the entity, a determination as to whether the entity is an authority in a topic associated with the search query such as based upon whether the entity has answered a threshold number of questions through a question and answer website, etc.). The identification information may be used to create a new tagline as the augmentation tagline based upon the identification information.

In another example, the social snippet may be augmented with an augmentation tagline comprising an indication of a commonality between the search user and the entity. For example, a social network of the search user (e.g., a search user profile of the search user, social network profile(s) of one or more friends of the search user, etc.) may be evaluated against the identification information of the entity to determine one or more commonalities between the search user and the entity (e.g., the organic farmer and the search user may both have an interest in running, may have attended the same school, have similar hobbies, are associated with a similar location (e.g., reside, work, vacation, etc. within a threshold proximity of one another), share a social network friend, etc.). In this way, the one or more augmentation taglines may indicate a relevance of the entity to the search user (e.g., how the organic farmer is relevant to the search query and/or how the organic farmer has common interests, hobbies, social network friends, or other commonalities with the search user). The augmented social snippet may be displayed through a search result interface associated with search results of the search query (e.g., the augmented social snippet may be displayed through a search app, a social network search interface, a mobile phone search interface, an operating system search interface, a search website, etc.).

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
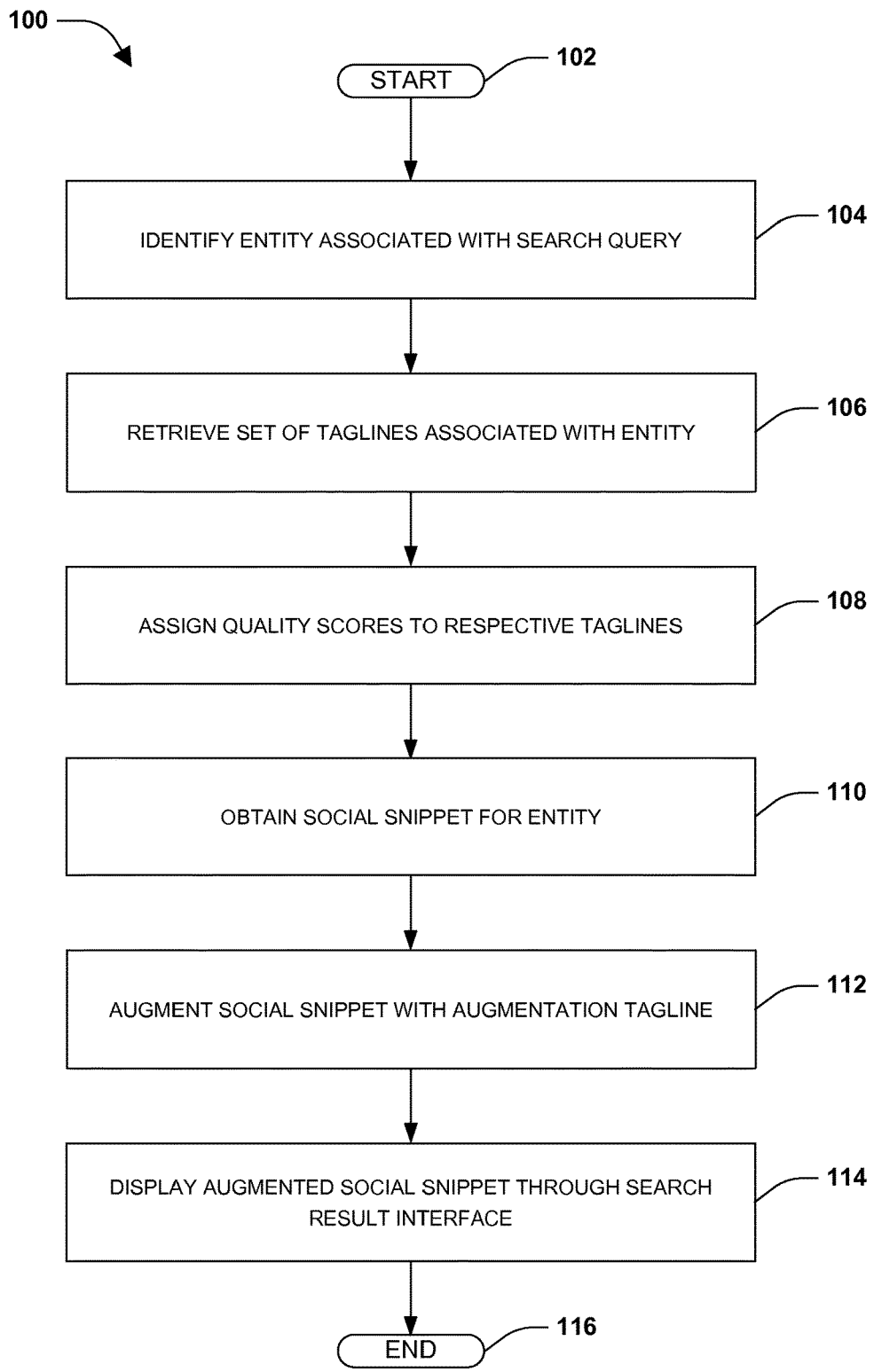
FIG. 1 is a flow diagram illustrating an exemplary method of augmenting a social snippet.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of augmenting a social snippet is illustrated by an exemplary method 100 of FIG. 1. At 102, the method starts. A search user may submit a search query through a search interface. For example, a user may submit a "how to plant trees" search query. At 104, an entity associated with the search query may be identified (e.g., a person, a business, a location, or other entity relating to a topic of the search query). Social networks, websites, documents, an entity data store, and/or other information may be consulted to identify the entity. For example, an entity of or corresponding to an agricultural professor (e.g., at times referred to as an "agricultural professor entity") may be identified based upon the agricultural professor entity corresponding to the "how to plant trees" search query. In an example, a plurality of entities may be identified, and a subset of the plurality of entities may be selected for social snippets. For example, a second entity (e.g., a grocery store produce employee entity) may be identified. A search user relevance ranking may be assigned to the agricultural professor entity (e.g., a relatively higher search user relevance ranking may be assigned based upon the agricultural professor entity having a relatively higher relevance to the search user and/or the "how to plant trees" search query), and a second search user relevance ranking may be assigned to the grocery store produce employee entity (e.g., a relatively lower search user relevance ranking may be assigned based upon the grocery store produce employee entity having a relatively lower relevance to the search user and/or the "how to plant trees" search query). In this way, the agricultural professor entity, but not the grocery store produce employee entity, may be selected for generating a social snippet because the agricultural professor entity has a higher relevance to the search user and/or the "how to plant trees" search query than the grocery store produce employee entity.

At 106, a set of taglines associated with the entity may be retrieved. A tagline may comprise textual information, imagery, and/or other information that may be descriptive of the entity. In an example, a personal social network tagline may indicate personal interests of the agricultural professor entity (e.g., a video game interest, a cooking interest, a home renovation interest, etc.), a professional network tagline may indicate business information of the agricultural professor entity (e.g., a current university at which the agricultural professor entity teaches, one or more schools attended by the agricultural professor entity, etc.), a document tagline may indicate that the agricultural professor entity is an author on tree growth articles, a question and answer website tagline may indicate that the agricultural professor entity is an authority on trees based upon the agricultural professor answering a threshold number of questions on agriculture, etc.

At 108, quality scores may be assigned to respective taglines within the set of taglines. A quality score may be based upon a relevance of a tagline to the search query, a source of a tagline, a length of a tagline, a reading level of a tagline, a second entity specified within a tagline (e.g., the document tagline may indicate that the agricultural professor entity is associated with a well-known tree planting group), a quality of a tagline, and/or a variety of other metrics that may be used to determine whether a tagline may effectively communicate a relevance of the entity to the search user. In an example, the search query may correspond to a business topic (e.g., a "how to make a tree growing company profitable" search query may correspond to a tree company business topic). Because the search query corresponds to a business topic, a relatively lower quality score may be assigned to a personal social network tagline (e.g., the personal social network tagline indicating that the agricultural professor entity has the home renovation interest) than a business social network tagline (e.g., the professional network tagline indicating business information of the agricultural professor entity). In another example, the search query may correspond to a personal topic (e.g., "how to plan trees around my house" search query). A relatively higher quality score may be assigned to the personal social network tagline (e.g., the personal social network tagline indicating that the agricultural professor entity has the home renovation interest) than the business social network tagline. In another example, a quality score may be decreased for a tagline based upon the tagline being previously displayed to the search user through a previous instance of a social snippet, which may mitigate displaying redundant information about the entity to the search user. For example, a round-robin approach may be utilized to select non-redundant taglines to display to the search user.

At 110, a social snippet may be obtained for the entity. For example, the social snippet may comprise textual information, imagery, and/or other information describing the entity. In an example, the social snippet may be obtained from a social snippet data store. In another example, the social snippet may be generated based upon the set of taglines and/or identifying information for the entity (e.g., information extracted from social networks, websites, documents, etc.).

At 112, the social snippet may be augmented with one or more augmentation taglines to generate an augmented social snippet. An augmentation tagline may indicate a relevance of the entity to the search user (e.g., the augmentation tagline may indicate how the agricultural professor entity relates to the "how to plant trees" search query and/or how the agricultural professor entity may have commonalities with the search user such as a shared interest in home renovations or that the agricultural professor entity teaches at a university attended by the search user). In an example, the augmentation tagline may be selected from the set of taglines based upon the augmentation tagline comprising a tagline assigned a quality score above an augmentation threshold (e.g., one or more relatively higher quality scores, quality scores above an 80% augmentation threshold, etc.). In an example, a social network of the search user (e.g., a search user profile of the search user, social network profile(s) of one or more friends of the search user, etc.) may be evaluated against identification information of the entity to determine a commonality between the search user and the entity. For example, a social network profile of the search user may indicate that the search user has an interest in home renovations, which is also an interest of the agricultural professor entity. Accordingly, the commonality of home renovations may be indicated within the augmentation tagline. It may be appreciated that the search user may enable or disable search user profiling (e.g., the search user may explicitly link a social network profile to a social snippet component or may disable utilization of search user profiles by the social snippet component).

In an example, the set of taglines do not comprise at least one tagline (e.g., the set of taglines may be an empty set) and/or the set of taglines do not comprise at least one tagline assigned a quality score above the augmentation threshold (e.g., quality scores may be below the 80% augmentation threshold). Accordingly, identification information for the entity may be retrieved. For example, a social network profile for the agricultural professor entity may be evaluated, a document created by the agricultural professor entity may be evaluated (e.g., an article on planting trees), a website associated with the entity (e.g., an agricultural association website indicating that the agricultural professor entity is an authority on planting trees), a company associated with the entity (e.g., a biography of the agricultural professor entity provided by a university website), a determination as to whether the agricultural professor entity is an authority in a topic associated with the search query (e.g., the agricultural professor entity may answer a threshold number of questions about trees through a question and answer website), etc. In this way, a new tagline may be constructed as the augmentation tagline based upon the identification information. In an example, a commonality between the search user and the agricultural professor entity may be specified within the new tagline.

At 114, the augmented social snippet may be displayed through a search result interface associated with search results of the search query. For example, one or more augmented social snippets may be displayed interspersed among search results, displayed in a separate visual interface from search results, or may be displayed in association with particular search results.

Because a tagline within an augmented social snippet may identify a relevance of an entity to a search user, different augmentation taglines and/or commonalities may be used to augment a social snippet based upon different search users submitting a search query. For example, a second search user may submit the "how to plant trees" search query. A second instance of the social snippet for the entity may be augmented with a second augmentation tagline different than the augmentation tagline (e.g., used to augment the social snippet for display to the search user) based upon a commonality between the second search user and the entity (e.g., the second search user and the agricultural professor entity may share an interest in cooking, and thus a cooking commonality may be used to augment the second instance of the social snippet). A second augmented social snippet may be generated and displayed to the second search user. In this way, augmented social snippets for an entity may be individually tailored and displayed to different search users.

In an example, a social snippet for an entity may be augmented based upon various information associated with a search user. For example, if a first search user logs into a social network and then performs a search query, then a social snippet for an entity identified from the search query may be augmented with personalized information associated with the first search user (e.g., commonalities between the first search user and the entity (e.g., a shared interest in basketball), information that may be interesting to the first search user (e.g., information corresponding to a location, job, hobby, etc.) or other personalized information made available by virtue of the first search user being logged into the social network). In contrast, if the first search user performs the search query without being logged into the social network, then the first search user may be presented with a "public view" of the social snippet for the entity. In another example, if a second search user logs into a social network and then performs the search query, then the social snippet for the entity may be augmented with personalized information associated with the second search user (e.g., where the personalized information associated with the second search user would likely be different than the personalized information associated with the first search user such that the social snippet would be augmented differently for the second search user than for the first search user).

Figure 2:
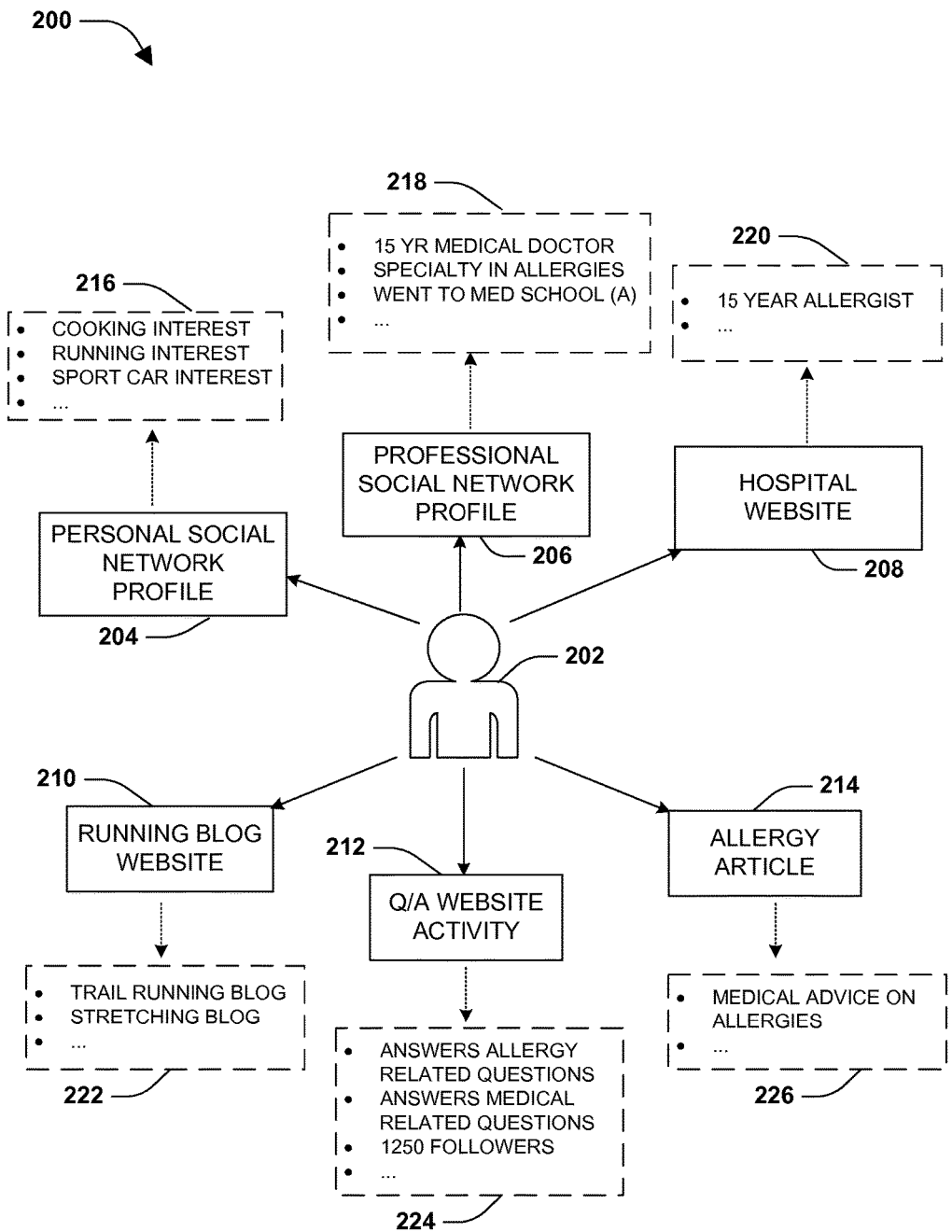
FIG. 2 is an illustration of an example of one or more taglines for an entity derived from one or more content sources.

FIG. 2 illustrates an example 200 of one or more taglines for an entity 202 derived from one or more content sources. The entity 202, such as Dr. Dave, may be associated with one or more content sources, such as a personal social network profile 204 (e.g., a Dr. Dave personal profile), a professional social network profile 206 (e.g., a Dr. Dave professional profile), a hospital website 208 (e.g., information for Dr. Dave as a doctor for a hospital), a running blog website 210 (e.g., Dr. Dave may write about running through the running blog website 210), a question and answer website activity 212 (e.g., Dr. Dave may answer questions about allergies, medical questions, running, cooking, and other topics), and an allergy article 214 (e.g., an article authored by Dr. Dave). A first tagline 216 may be derived from the personal social network profile 204 (e.g., the Dr. Dave personal profile may indicate that Dr. Dave has an interest in cooking, running, sports cars, etc.). A second tagline 218 may be derived from the professional social network profile 206 (e.g., the Dr. Dave professional profile may indicate that Dr. Dave has been a medical doctor for 15 years, that Dr. Dave specializes in allergies, and that Dr. Dave went to Med School (A)). A third tagline 220 may be derived from the hospital website 208 (e.g., an indication that Dr. Dave has been an allergist for the hospital for 15 years). A fourth tagline 222 may be derived from the running blog website 210 (e.g., Dr. Dave may write blogs about trail running and stretching). A fifth tagline 224 may be derived from the question and answer website activity 212 (e.g., Dr. Dave may have answered allergy and medical related questions, and may have 1250 followers). A sixth tagline 226 may be derived from the allergy article 214 (e.g., Dr. Dave wrote the allergy article 214 regarding medical advice on allergies). In this way, one or more taglines for the entity 202 may be identified, retrieved, and/or created.

Figure 3:
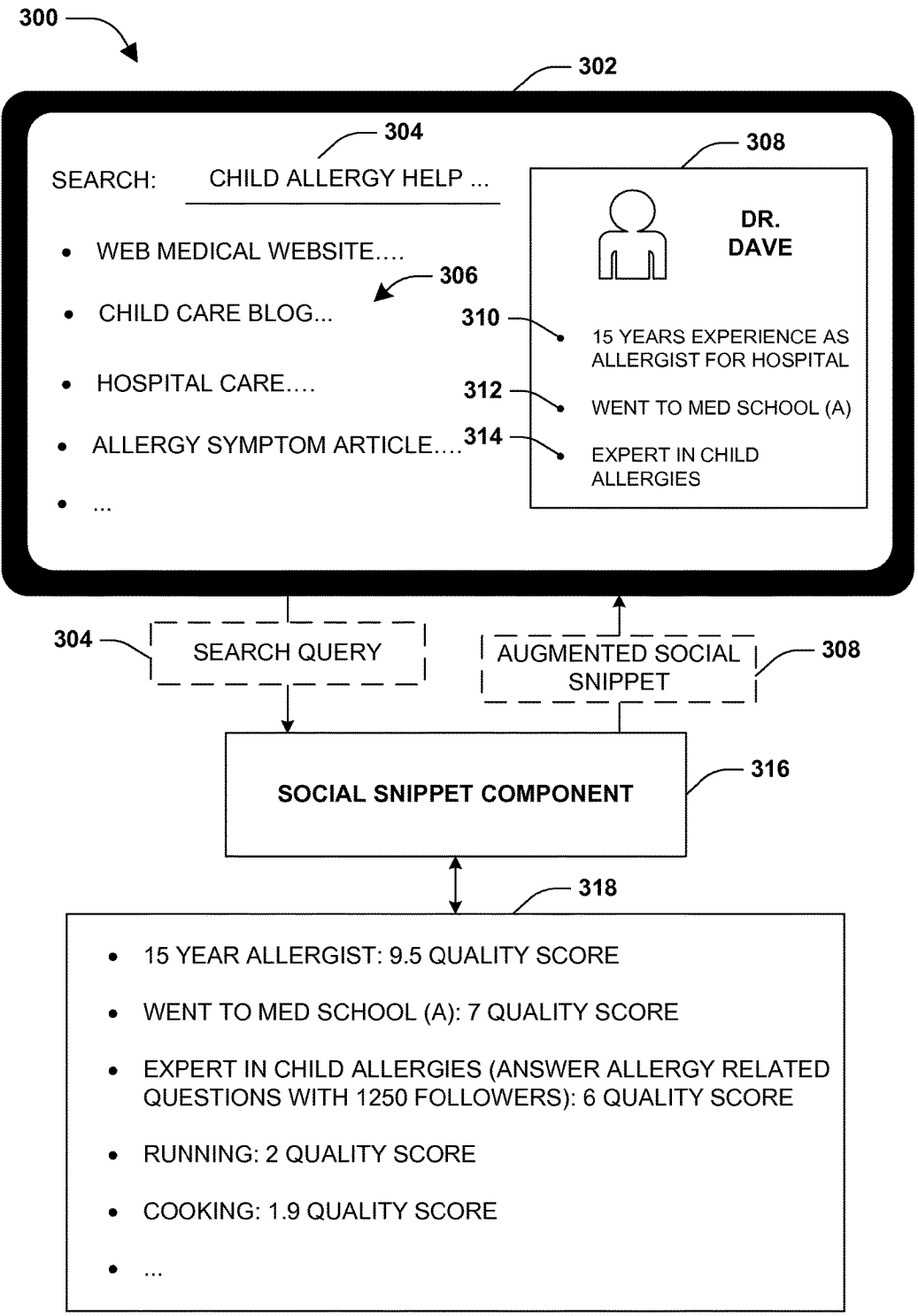
FIG. 3 is a component block diagram illustrating an exemplary system for augmenting a social snippet.

FIG. 3 illustrates an example of a system 300 for augmenting a social snippet. The system 300 may comprise a social snippet component 316 associated with a search interface 302. A search user may submit a "child allergy help" search query 304 through the search interface 302. The social snippet component 316 may be configured to identify an entity associated with the "child allergy help" search query 304, such as a Dr. Dave entity (e.g., entity 202 of FIG. 2). The social snippet component 316 may be configured to retrieve a set of taglines 318 associated with the Dr. Dave entity (e.g., first tag line 216, second tagline 218, third tagline 220, fourth tagline 222, fifth tagline 224, and sixth tagline 226 of FIG. 2).

The social snippet component 316 may be configured to assign quality scores to taglines or portions thereof within the set of tagline 318. For example, relatively higher quality scores may be assigned to a 15 year allergist tagline (e.g., a portion of the third tagline 220 from a hospital website 208), a went to Med School (A) tagline (e.g., a portion of the second tagline 218 from a professional social network profile 206), and an expert in child allergies tagline (e.g., a portion of a fifth tagline 224 from a question and answer website activity 212) because such taglines may have a relatively higher relevance to the "child allergy help" search query 304 deemed to be associated with a medical professional topic more so than a personal interest topic (e.g., the taglines correspond to medical professional topics, are extracted from medical professional sources, and/or have relatively higher quality information). Relatively lower quality scores may be assigned to the running tagline (e.g., a portion of the first tagline 216 from a personal social network profile 204) and a cooking tagline (e.g., a portion of the first tagline 216 from the personal social network profile 204) because such taglines may have relatively lower relevance to the "child allergy help" search query 304 (e.g., the taglines correspond to personal interests, are extracted from personal content sources, and/or have relatively lower quality information).

The social snippet component 316 may obtain a social snippet for the Dr. Dave entity. The social snippet component 316 may augment the social snippet with one or more augmentation taglines, such as a 15 year allergist tagline 310, a went to Med School (A) tagline 312, and an expert in child allergies tagline 314 to create an augmented social snippet 308. The social snippet component 316 may display the augmented social snippet 308 through the search interface 302 associated with search results 306 relevant to the "child allergy help" search query 304. In this way, the augmented social snippet 308 may indicate a relevance of the Dr. Dave entity to the search user.

Figure 4:
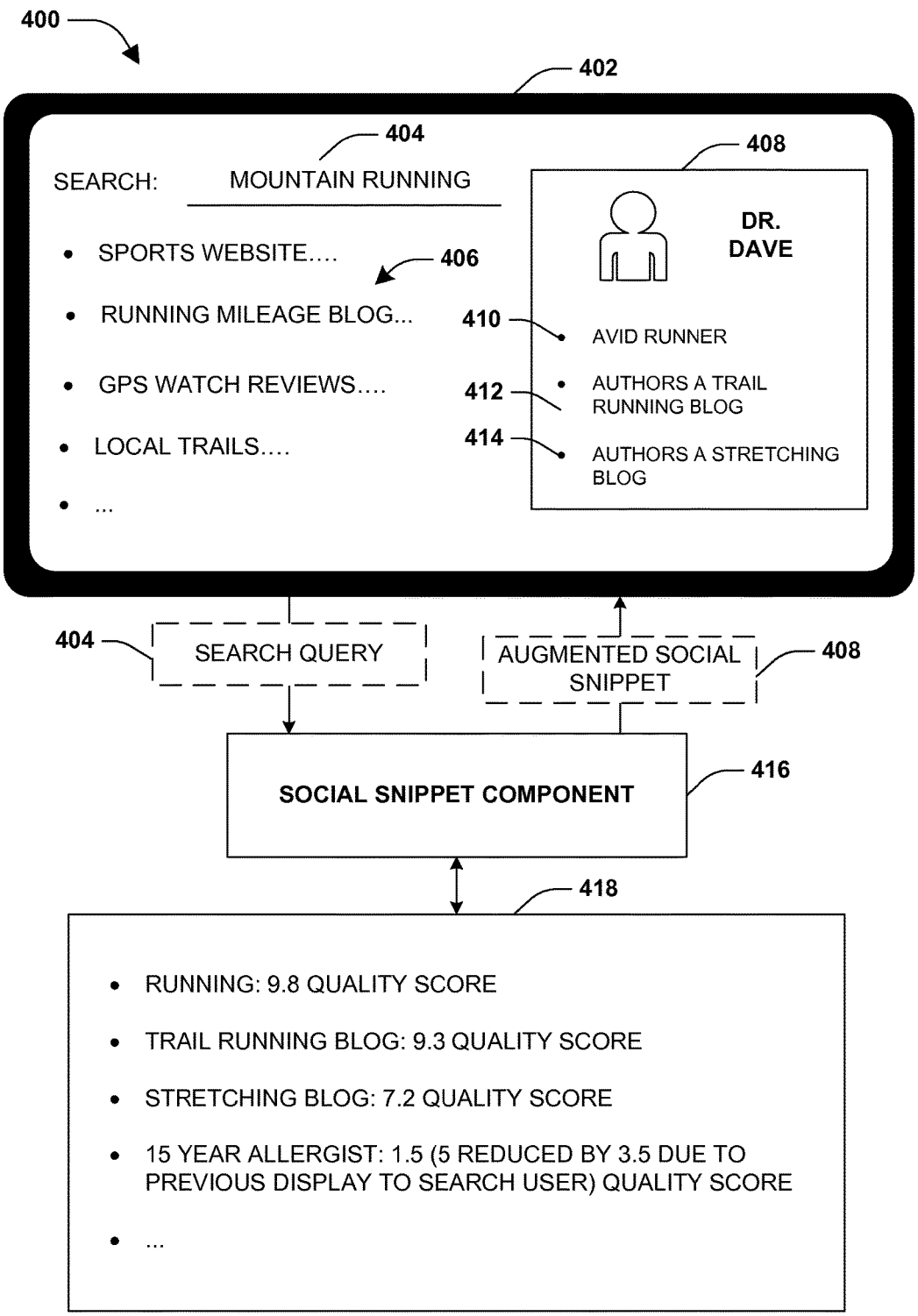
FIG. 4 is a component block diagram illustrating an exemplary system for augmenting a social snippet.

FIG. 4 illustrates an example of a system 400 for augmenting a social snippet. The system 400 may comprise a social snippet component 416 associated with a search interface 402. A search user may submit a "mountain running" search query 404 through the search interface 402. The social snippet component 416 may be configured to identify an entity associated with the "mountain running" search query 404, such as a Dr. Dave entity that has an interest in running, and maintains trail running blogs, stretching blogs, and writes articles regarding running (e.g., entity 202 of FIG. 2). The social snippet component 416 may be configured to retrieve a set of taglines 418 associated with the Dr. Dave entity (e.g., first tag line 216, second tagline 218, third tagline 220, fourth tagline 222, fifth tagline 224, and sixth tagline 226 of FIG. 2).

The social snippet component 416 may be configured to assign quality scores to taglines or portions thereof within the set of tagline 418. For example, relatively higher quality scores may be assigned to a running tagline (e.g., a portion of the first tagline 216 from a personal social network profile 204), a trail running blog tagline (e.g., a portion of the fourth tagline 222 from a running blog website 210), and a stretching blog tagline (e.g., a portion of the fourth tagline 222 from the running blog website 210) because such taglines may have a relatively higher relevance to the "mountain running" search query 404 deemed to be associated with personal interest topics more so than professional topics (e.g., the taglines correspond to personal running topics, are extracted from personal content sources, etc.). A relatively lower quality score may be assigned to a 15 year allergist tagline (e.g., a portion of the third tagline 220 from a hospital website 208) because the 15 year allergist tagline may have a relatively lower relevance to the "mountain running" search query 404. In an example, the relatively lower quality score of 5, assigned to the 15 year allergist tagline, may be reduced by 3.5, thus resulting in a quality score of 1.5 because the 15 year allergist tagline may have been previously displayed to the search user through a previous instance of the social snippet for the Dr. Dave entity (e.g., the 15 year allergist tagline 310 of FIG. 3), which may mitigate redundant display of information to the search user.

The social snippet component 416 may obtain a social snippet for the Dr. Dave entity. The social snippet component 416 may augment the social snippet with one or more augmentation taglines, such as an avid runner tagline 410, an authors a trail running blog tagline 412, and an authors a stretching blog tagline 414 to create an augmented social snippet 408. The social snippet component 416 may display the augmented social snippet 408 through the search interface 402 associated with search results 406 relevant to the "mountain running" search query 404. In this way, the augmented social snippet 408 may indicate a relevance of the Dr. Dave entity to the search user.

Figure 5:
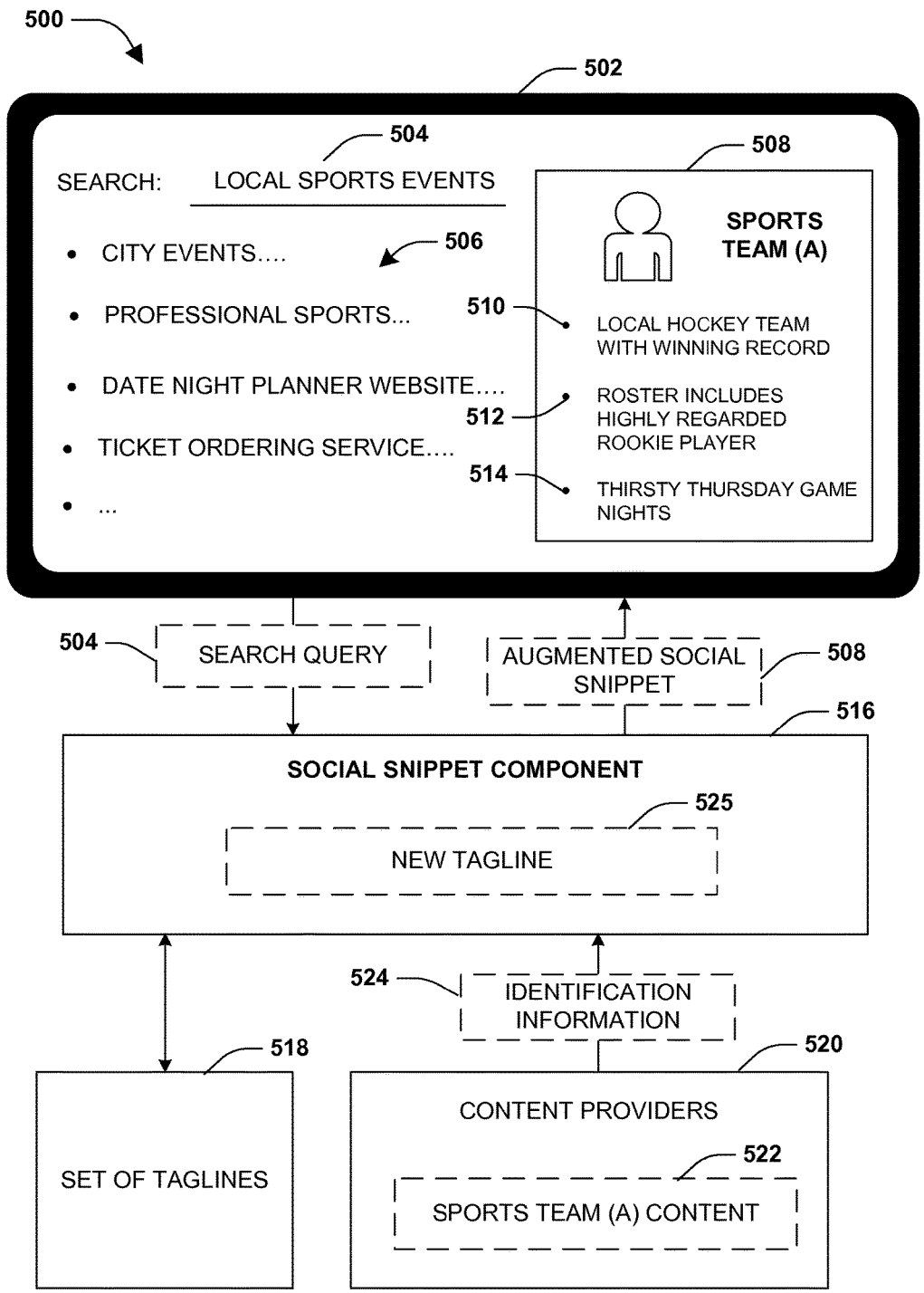
FIG. 5 is a component block diagram illustrating an exemplary system for constructing a new tagline for augmenting a social snippet.

FIG. 5 illustrates an example of a system 500 for constructing a new tagline for augmenting a social snippet. The system 500 may comprise a social snippet component 516 associated with a search interface 502. A search user may submit a "local sports events" search query 504 through the search interface 502. The social snippet component 516 may be configured to identify an entity associated with the "local sports events" search query 504, such as a Sports Team (A) entity (e.g., a hockey team located near the search user). The social snippet component 516 may be configured to retrieve a set of taglines 518 associated with the Sports Team (A) entity.

In an example, the set of taglines 518 is an empty set comprising no taglines or the set of taglines 518 do not comprise at least one tagline having a quality score above an augmentation threshold. Accordingly, the social snippet component 516 may be configured to retrieve identification information 524 for the Sports Team (A) entity, such as Sports Team (A) content 522 from one or more content providers 520 (e.g., a sports website describing a winning record for the Sports Team (A) entity; a city events website describing a thirsty Thursday game night for the Sports Team (A) entity; a social network profile describing a roster for the Sports Team (A) entity; etc.). The social snippet component 516 may be configured to construct a new tagline 525 for the Sports Team (A) entity based upon the identification information 524. The new tagline 525 may be used as an augmented tagline for augmenting a social snippet to create an augmented social snippet 508 for the Sports Team (A) entity. The augmented social snippet 508 may comprise one or more taglines derived from the identification information 524, such as a local hockey team winning record tagline 510, a roster tagline 512, and a thirsty Thursday game night tagline 514. The social snippet component 516 may be configured to display the augmented social snippet 508 through the search interface 502 associated with search results 506 relevant to the "local sports events" search query 504.

Figure 6:
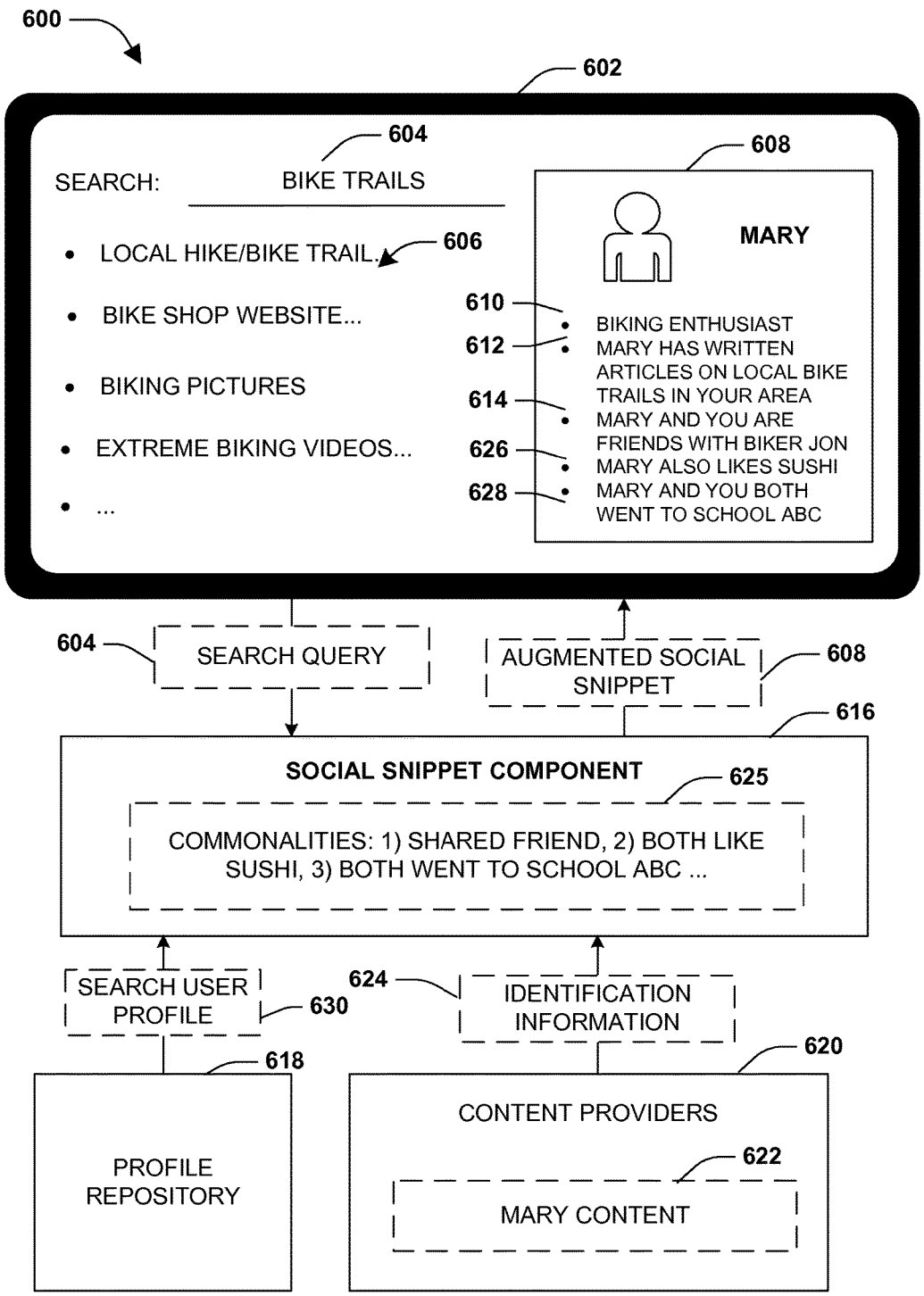
FIG. 6 is a component block diagram illustrating an exemplary system for augmenting a social snippet with one or more commonalities.

FIG. 6 illustrates an example of a system 600 for augmenting a social snippet with one or more commonalities. The system 600 may comprise a social snippet component 616 associated with a search interface 602. A search user may submit a "bike trails" search query 604 through the search interface 602. The social snippet component 616 may be configured to identify and/or generate a search user profile 630 associated with the search user (e.g., retrieve the search user profile 630 from a profile repository 618; derive the search user profile 630 from a social network profile; derive the search user profile 630 from a website or document; etc.). In an example, the profile repository 618 may correspond to data about the search user made available or accessible through a social network (e.g., upon the search user logging into a social network). That is, the profile repository 618 may comprise, among other things, social network information about the search user. The search user profile 630 may thus, for example, be derived from a social network (e.g., once the search user logs into the social network) (e.g., friends, acquaintances, likes, activity history, etc. of the search user). For example, the search user profile 630 may indicate that the search user has a social network friend Biker Jon, likes sushi, went to School ABC, is a runner, etc. In this way, the social snippet component 616 may use the search user profile 630 to provide the search user with personalized information as to how an entity described in a social snippet may be relevant to the search user (e.g., the search user profile 603 may be used to identify information used to indicate a commonality between the search user and an entity). It may be appreciated that the search user may enable or disable search user profiling (e.g., the search user may explicitly link a social network profile to the social snippet component 616 or may disable utilization of search user profiles by the social snippet component 616).

The social snippet component 616 may be configured to identify an entity associated with the "bike trails" search query 604, such as a Mary entity (e.g., Mary may be a biking enthusiast that has written many articles on biking). The social snippet component 616 may be configured to retrieve identification information 624 for the Mary entity, such as Mary content 622 from one or more content providers 620 (e.g., a social network profile for Mary may specify that Mary is friends with Biker Jon, likes sushi, and went to School ABC). The social snippet component 616 may be configured to evaluate a social network of the search user, such as the search user profile 630, against the identification information 624 to determine one or more commonalities 625 between the search user and the Mary entity. For example, the one or more commonalities 625 may indicate that the search user and the Mary entity are social network friends with Biker Jon, like sushi, and went to School ABC. Accordingly, the social snippet component 616 may be configured to indicate the one or more commonalities 625 through a social snippet for the Mary entity to create an augmented social snippet 608 for the Mary entity. For example, the augmented social snippet 608 may comprise a first augmentation tagline 610 (e.g., indicating that Mary is a biking enthusiast), a second augmentation tagline 612 (e.g., indicating that Mary has written articles on local bike trails), a third augmentation tagline 614 indicating a shared social network friend commonality of Biker Jon, a fourth augmentation tagline 626 indicating a shared interest commonality in sushi, and a fifth augmentation tagline 628 indicating a school commonality. In this way, the social snippet component 616 may display the augmented social snippet 608 through the search interface 602, such that the augmented social snippet 608 may indicate how the Mary entity is related to the "bike trails" search query 604 and/or how the Mary entity personally relates to the search user. It will thus be appreciated that social snippets may be personalized based upon social network and/or other information. For example, where the search user submits a search query and is presented with a social snippet that is augmented in a first manner based upon social network information associated with the search user (e.g., the search user logged into a first social network) that same social snippet would likely be augmented in a second (e.g., different) manner for a second search user (e.g., that submits the same query) based upon social network information associated with the second search user (e.g., the second search user logged into a second social network, which may be the same or different than the first social network).

Figure 7:
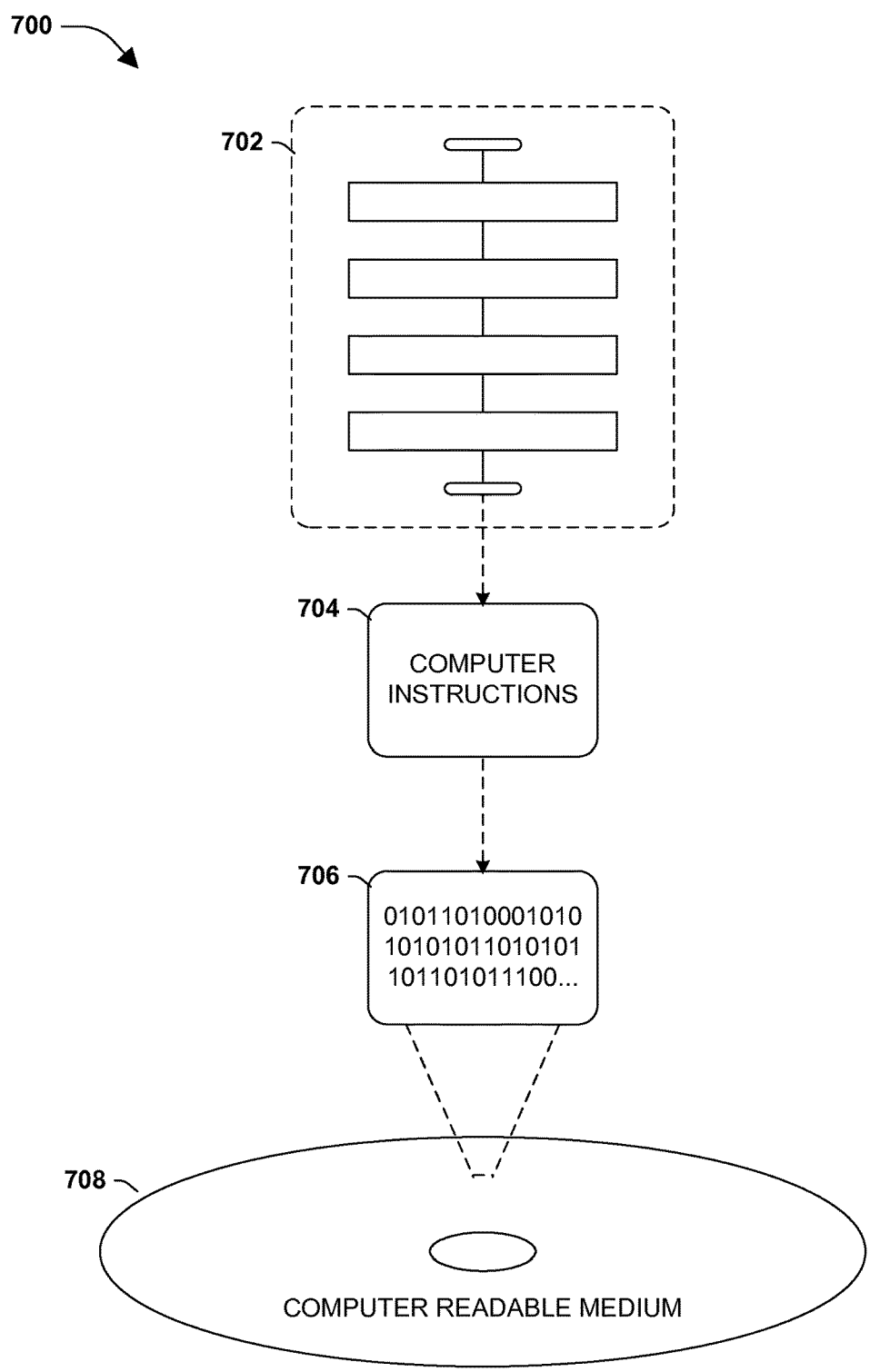
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1, for example. In some embodiments, the processor-executable instructions 704 are configured to implement a system, such as at least some of the exemplary system 300 of FIG. 3, at least some of the exemplary system 400 of FIG. 4, at least some of the exemplary system 500 of FIG. 5, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
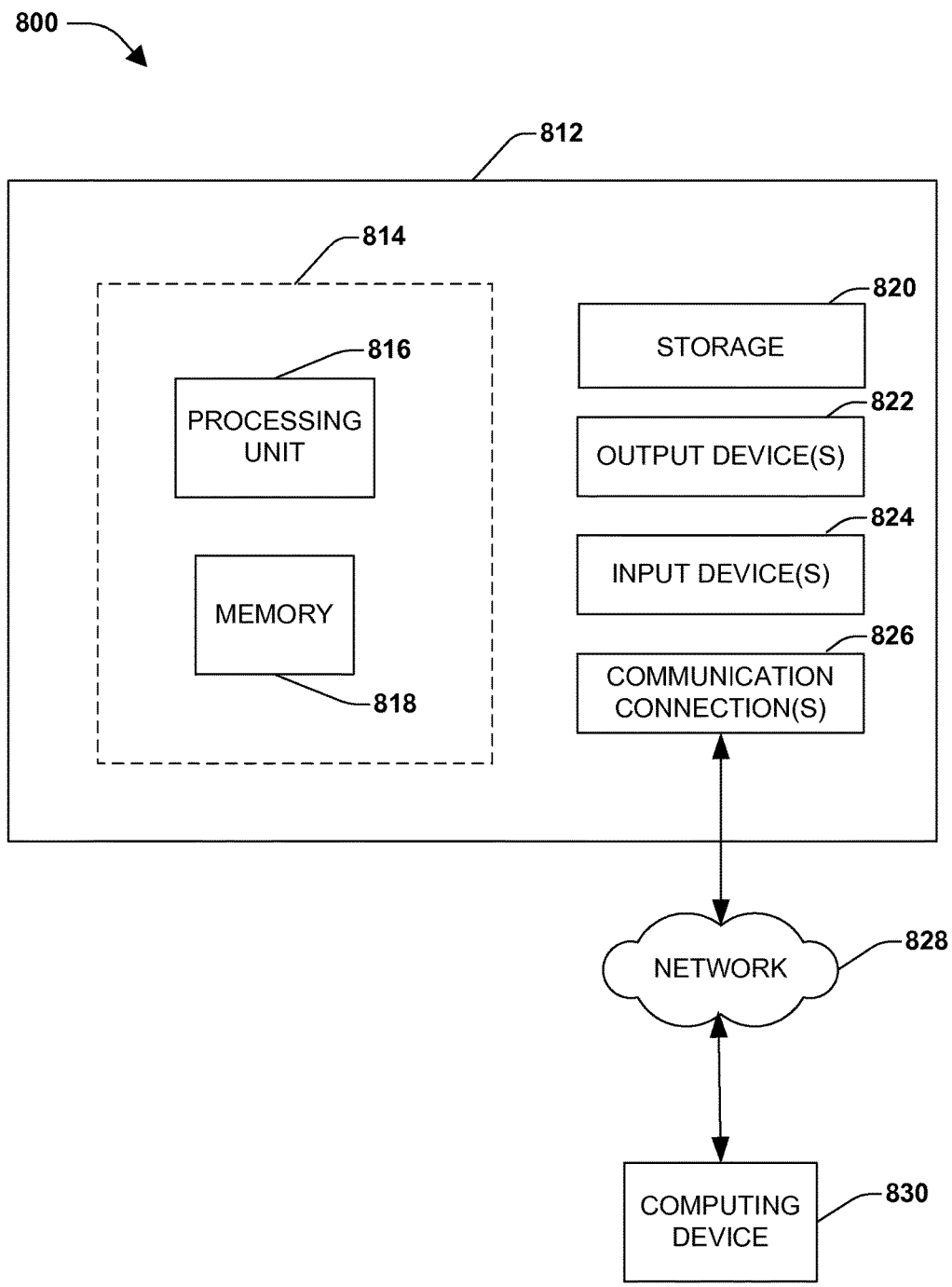
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising" . . . .

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for augmenting a social snippet, comprising:
identifying an entity associated with a search query;
retrieving a set of taglines associated with the entity;
assigning quality scores to respective taglines within the set of taglines based at least in part on the respective taglines indicating a relevance of the entity to the search query;
obtaining a social snippet for the entity, the social snippet having been generated independently of the search query;
determining an augmentation threshold such that taglines having assigned scores above the determined augmentation threshold are, based on their assigned scores, determined to be more indicative of the relevance of the entity to the search query than the obtained social snippet;
augmenting the social snippet with an augmentation tagline selected from a first subset of taglines, each having been assigned a quality score above the augmentation threshold; and
displaying the augmented social snippet through a search result interface associated with search results of the search query.

2. The method of claim 1, the entity comprising at least one of a person, a business, time, a tangible object, an idea, an intangible item, or a location.

3. The method of claim 1, comprising:
responsive to the set of taglines not comprising at least one tagline or not comprising at least one tagline assigned a quality score above the augmentation threshold:
retrieving identification information for the entity; and
constructing a new tagline as the augmentation tagline based upon the identification information.

4. The method of claim 3, the retrieving identification information comprising at least one of:
evaluating a social network profile for the entity;
evaluating a document created by the entity;
evaluating a website associated with the entity;
evaluating a company associated with the entity; or
determining whether the entity is an authority in a topic associated with the search query.

5. The method of claim 3, the constructing a new tagline comprising:
evaluating a social network of a search user that submitted the search query against the identification information to determine a commonality between the search user and the entity; and
indicating the commonality within the new tagline.

6. The method of claim 1, comprising:
evaluating a social network of a search user that submitted the search query against identification information of the entity to determine a commonality between the search user and the entity; and
indicating the commonality within the augmentation tagline.

7. The method of claim 6, the commonality corresponding to at least one of a business, a sports activity, a hobby, a social network friend, a school, an area of expertise, a location, or a common interest.

8. The method of claim 1, the assigning quality scores comprising:

assigning a first quality score to a first tagline based upon at least one of an assumed interest level of the user, a quality of the first tagline, a source of the first tagline, a length of the first tagline, a reading level of the first tagline, a language of the first tagline, or a second entity specified within the first tagline.

9. The method of claim 1, the search query corresponding to a business topic, and the assigning quality scores comprising:
assigning a first quality score to a first tagline based upon a first source of the first tagline comprising a personal social network; and
assigning a second quality score to a second tagline based upon a second source of the second tagline comprising a professional social network, the second quality score higher than the first quality score based upon the search query corresponding to the business topic.

10. The method of claim 1, the search query corresponding to a personal topic, and the assigning quality scores comprising:
assigning a first quality score to a first tagline based upon a first source of the first tagline comprising a personal social network; and
assigning a second quality score to a second tagline based upon a second source of the second tagline comprising a professional social network, the first quality score higher than the second quality score based upon the search query corresponding to the personal topic.

11. The method of claim 1, the assigning the quality scores being based at least in further part on the respective taglines indicating a relevance of the entity to a search user that submitted the search query.

12. The method of claim 1, the search query associated with a search user, and the method comprising:
identifying the entity as being associated with a second search query submitted by a second search user different than the search user; and
augmenting a second instance of the social snippet for the entity with a second augmentation tagline different than the augmentation tagline based upon a commonality between the second search user and the entity to generate a second augmented social snippet.

13. The method of claim 1, the search query associated with a search user, and the assigning quality scores comprising:
decreasing a first quality score assigned to a first tagline based upon the first tagline being previously displayed to the search user through a previous instance of the social snippet.

14. The method of claim 1, the augmenting the social snippet comprising:
augmenting the social snippet with a second augmentation tagline.

15. The method of claim 1, the search query associated with a search user, and the method comprising:
identifying a second entity as associated with the search query;
assigning a search user relevance ranking to the entity based upon a relevance of the entity to the search user;
assigning a second search user relevance ranking to the second entity based upon a relevance of the second entity to the search user; and
selectively generating the social snippet for the entity, but not a second social snippet for the second entity, based upon the search user relevance ranking being higher than the second search user relevance ranking.

16. A computer hardware system for augmenting a social snippet, comprising:
a social snippet component configured to:
identify an entity associated with a search query;
retrieve a set of taglines associated with the entity;
assign quality scores to respective taglines within the set of taglines based at least in part on the respective taglines indicating a relevance of the entity to the search query;
obtain a social snippet for the entity, the social snippet having been generated independently of the search query;
determine an augmentation threshold such that taglines having assigned scores above the determined augmentation threshold are, based on their assigned scores, determined to be more indicative of the relevance of the entity to the search query than the obtained social snippet;
augment the social snippet with an augmentation tagline selected from a first subset of taglines, each having been assigned a quality score above the augmentation threshold; and
display the augmented social snippet through a search result interface associated with search results of the search query.

17. The computer hardware system of claim 16, the social snippet component configured to:
responsive to the set of taglines not comprising at least one tagline or not comprising at least one tagline assigned a quality score above the augmentation threshold;
retrieve identification information for the entity; and
construct a new tagline as the augmentation tagline based upon the identification information.

18. The computer hardware system of claim 16, the social snippet component configured to:
evaluate a social network of a search user that submitted the search query against identification information of the entity to determine a commonality between the search user and the entity; and
indicate the commonality within the augmentation tagline.

19. The computer hardware system of claim 16, the search query associated with a search user, and the social snippet component configured to:
identify the entity as being associated with a second search query submitted by a second search user different than the search user; and
augment a second instance of the social snippet for the entity with a second augmentation tagline different than the augmentation tagline based upon a commonality between the second search user and the entity to generate a second augmented social snippet.

20. A computer readable memory comprising instructions which when executed at least in part via a processing unit perform a method for augmenting a social snippet, comprising:
identifying an entity associated with a search query;
retrieving a set of taglines associated with the entity;
assigning quality scores to respective taglines within the set of taglines based at least in part on the respective taglines indicating a relevance of the entity to the search query;
obtaining a social snippet for the entity, the social snippet having been generated independently of the search query;

determining an augmentation threshold such that taglines having assigned scores above the determined augmentation threshold are, based on their assigned scores, determined to be more indicative of the relevance of the entity to the search query than the obtained social snippet; and responsive to the set of taglines not comprising at least one tagline or not comprising at least one tagline assigned a quality score above the augmentation threshold:

retrieving identification information for the entity; and constructing a new tagline as an augmentation tagline based upon the identification information.

* * * * *